(12) United States Patent
Ribi

(10) Patent No.: US 7,813,025 B2
(45) Date of Patent: Oct. 12, 2010

(54) FLASH IMAGING DEVICES, METHODS FOR MAKING AND USING THE SAME

(75) Inventor: Hans O. Ribi, Hillsborough, CA (US)

(73) Assignee: Segan Industries Inc., Burlingame, CA (US)

( * ) Notice: Subject to any disclaimer, the term of this patent is extended or adjusted under 35 U.S.C. 154(b) by 644 days.

(21) Appl. No.: 10/571,979

(22) PCT Filed: Sep. 17, 2004

(86) PCT No.: PCT/US2004/030680

§ 371 (c)(1),
(2), (4) Date: Apr. 11, 2007

(87) PCT Pub. No.: WO2005/029163

PCT Pub. Date: Mar. 31, 2005

(65) Prior Publication Data

US 2007/0273951 A1    Nov. 29, 2007

Related U.S. Application Data

(60) Provisional application No. 60/504,695, filed on Sep. 17, 2003.

(51) Int. Cl.
*G02F 1/01* (2006.01)

(52) U.S. Cl. ........................................ 359/288; 359/240

(58) Field of Classification Search .......... 359/240–245, 359/265, 270, 272, 288, 315, 322, 323
See application file for complete search history.

(56) References Cited

U.S. PATENT DOCUMENTS

| | | | | |
|---|---|---|---|---|
| 3,567,908 A | * | 3/1971 | Ingenito | ...................... 219/486 |
| 4,236,156 A | | 11/1980 | Eden | |
| 4,827,085 A | * | 5/1989 | Yaniv et al. | .................. 345/174 |
| 5,223,958 A | * | 6/1993 | Berry | ........................... 349/20 |
| 5,403,039 A | | 4/1995 | Borowski, Jr. et al. | |
| 5,444,330 A | * | 8/1995 | Leventis et al. | ............. 313/506 |
| 5,754,329 A | * | 5/1998 | Coleman | ..................... 359/254 |
| 6,020,989 A | | 2/2000 | Watanabe | |
| 6,097,145 A | | 8/2000 | Kastalsky et al. | |
| 6,762,150 B2 | * | 7/2004 | Sawano | ....................... 503/201 |

* cited by examiner

*Primary Examiner*—William C Choi
(74) *Attorney, Agent, or Firm*—Bret E. Field; Bozicevic, Field & Francis LLP

(57) ABSTRACT

The invention provides flash imaging devices that include an optical change component that undergoes a change in response to an applied stimulus, a substrate and a stimulus element. Also provided are articles that include the subject devices, as well as methods of making and using the same.

20 Claims, No Drawings

FLASH IMAGING DEVICES, METHODS FOR MAKING AND USING THE SAME

CROSS-REFERENCE TO RELATED APPLICATIONS

Pursuant to 35 U.S.C. §119 (e), this application claims priority to the filing date of U.S. Provisional Patent Application Ser. No. 60/504,695 filed Sep. 17, 2003; the disclosure of which is herein incorporated by reference.

INTRODUCTION

1. Background of the Invention

Composite materials are structures or entities that are made up of distinct components. A variety of different types of composite materials have been developed and employed in a multitude of different and diverse applications. Because of utility of composite materials, there continues to be an interest in the development of new composite materials.

2. Relevant Literature

See e.g., U.S. Pat. Nos. 4,702,563; 4,702,564; 4,950,258; 5,344,191, 5,491,420; 5,571,568; 5,685,641; 5,867,028; 5,925,480; 6,054,234; 6,156,450; 6,294,111; 6,307,605; 6,307,664; 6,787,108.

SUMMARY OF THE INVENTION

The invention provides flash imaging devices that include an optical change component that undergoes a change in response to an applied stimulus, a substrate and a stimulus element. Also provided are articles that include the subject devices, as well as methods of making and using the same.

DESCRIPTION OF THE SPECIFIC EMBODIMENTS

The invention provides flash imaging devices that include an optical change component that undergoes a change in response to an applied stimulus, a substrate and a stimulus element. Also provided are articles that include the subject devices, as well as methods of making and using the same.

Before the present invention is further described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Methods recited herein may be carried out in any order of the recited events which is logically possible, as well as the recited order of events.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications mentioned herein are incorporated herein by reference to disclose and describe the methods and/or materials in connection with which the publications are cited.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

As summarized above, the invention involves a visual (also referred to herein as optical) layer which can be reversibly or irreversibly stimulated to induce an image, lettering, design, graphic, message or an intended visual output. The visual output can be generated by a thermochromic, thermoluminescent, electroluminescent, photochromic or alternative chromic change agent. The visual output can be initiated by an underlying obscured layer containing an electrically conducting circuit which can be used as a heating element or to induce a charge or impulse which stimulates the visual layer. During the induction process, a desired visual change is generated in the visual layer such that a clear and well-defined and intended display occurs.

A wide range of visual outputs can be designed and utilized. Printed messages, lettering, geometries, graphics, line art, symbols, text, printed matter, warning messages, cartoons, brand names, advertising messages, sales messages, lines, dots, pictures, stick figures, label information, instructions, arrows, signals, sequence information, combinations, logic formation, control panel information, product information, characters, numbers, digits, books, enabling animated books, displays, substrates, packages, codes and the like could be displayed, revealed, modified or the like.

Planar or three-dimensional surfaces, rigid or pliable surfaces, textured or smooth surfaces, hot, ambient, or cooled surfaces, adjacent to or congruent with display screens such as liquid crystal displays or cathode ray tubes, medical adhesives, food containers, auto bodies or parts, clothing, shoes, and the like can be utilized.

Mediums for thermo-luminescent/thermochromic flash printing and messaging can be free-standing comprising of only the components necessary to construct the embodiment or can be associated with a rigid or pliable surface. Since the flash printing or messaging component can be made using flexible circuits, printed conducting inks or the like, and since the luminescent or thermochromic material likewise can be formulated using flexible resins or printing bases, the entire embodiment can comprise a flexible, attachable and or printable configuration and be used with either rigid or pliable substrates.

Application embodiments and applications include, but are not limited to, interactive packaging, playing cards, flash math and reading cards, story books, coloring books, business cards, credit cards, gift debit cards, tokens, in/out guest and visitor cards, security cards, warning signs, point-of-purchase signs, guest reservation signs, store display signs, sale signs, tattoos for skin, wound dressings for signifying agent release or condition, heat-laminated pouches, self-adhesive laminating pouches, magazine pages, mailers, envelopes, computer screens, commercial and retail signs, road signs, painted road signs and markings, greeting cards, mailers, boxes, receipts, thermoformed packaging, room key cards for hotels and secured doors, interactive toys, game boards, puzzles and puzzle pieces, snap-together building blocks, self-destruct messaging, tickets to shows, parks, sporting events, and the like.

Substrates finding use in the subject composite structures can include rigid or pliable paper, various plastics, fabrics, films, skin, card board, wood, composites, Kapton tape, standard adhesive tape, medical grade adhesives, glass, thermal switch mediums (e.g. Interlemer materials from Landec Corporation), dissolving labels used in restaurant supply, pressure sensitive label stock, metal which acts as an insulation coating, Styrofoam, paper and plastic cups, candy wrappers, solid food substrates, painted surfaces, coated surfaces, powder coated surfaces, anodized aluminum surfaces, liquid crystal displays used with computers and electronic devices, heat shrink packaging labels, vinyl covering for toys and packaging, room temperature vulcanized rubber, rubber substrates, silicon rubber used for items such as key pads and the like.

As such, substrates for flash imaging are varied. A variety of flash imaging substrates including plain paper, ink jet paper, quality paper, manila weight paper, card board, corrugated paper, particle board, Tyvek™, coated papers, uncoated papers, pre-printed papers, paper bags, packaging paper, glow-in-the-dark paper, glow-in-the-dark ink jet printing paper, velum, stiff or flexible papers, glossy or matt finished papers, paper labels, wrapping paper, pressure sensitive papers, paper sign material, poster board, photographic paper, medical grade adhesive bandage materials, on laminated restaurant menus, plastic films, plastic sheets, treated plastics, shape changing plastic surfaces, plastic bag stock, pre-sized plastic bags, vinyl sheet, heat sealed vinyl bags, plastic packaging, plastic window stickers, pressure sensitive plastic films, balloons, liquid crystal display surfaces, furniture surfaces, plastic sign stock, corrugated plastic stock, on plastic compact discs, on digital video discs, on plastic toys, plastic tube material, plastic coating on wire, plastic wrapper material, printed-plastic surfaces, plastic consumer items, plastic dishes and storage containers, molded plastic items, two-dimensional surfaces and three dimensional surfaces, wood surfaces, treated wood surfaces, paint coatings, plastic coatings, film coated surfaces, plastic containers, food containers, blister packaging, thermoformed plastic surfaces, foam board, continuous surfaces, ceramic surfaces, fabric surfaces, powder coated surfaces, rubberized surfaces, anodized surfaces, non-stick coated surfaces, folding surfaces, flexible circuits (Flextronics Inc.), printed circuit board material, encased materials, semi-conductor surfaces, tape surfaces both paper and plastic, heat shrink plastic surfaces, book covers, book pages, laminated surfaces, plant surfaces, on rulers, on disposable plastic items, on reusable plastic items, on coated metals, on polished surfaces, on abraded surfaces, glass surfaces, and a range of other surfaces.

In certain embodiments, a flash imaging circuit can be embedded into a surface. By way of example, the circuit can be a component of a consumer product such as a tool, camera, digital electronic device, a promotional component on a consumer package, a play toy, in an automobile cab, on the exterior of an automobile, a promotional insert in a magazine, or an add on to an existing product line. The flash imaging component can be integrated into a surface and protected with an overlaying film, window or other transparent medium that provides viewing of the circuit.

Images, messages, and visual affects can be flashed on 3-dimensional or contoured surfaces on products, display surfaces, toys, figures, games, or any intended non-planar surface where it is desirable to generate a visual optical change. By way of example, an action toy figure can have a surface which is printed in a format. By pressing a button on the figure, the surface can be made to display a visual effect on the toy such that the toy has new extended play value. Eyes for example on a doll can be made to change color when a button is pushed. Package materials with contoured surfaces can be used as an advertising means to visually and attractively change color or visually induce an intended message. Contoured or 3-dimensional surfaces can be smooth or sharply angled. The exact geometry of the surface can be designed and comprise the intended flash change depending on the intended use.

Self-destructing flash imaging substrates can be made by applying a electrical thermally conducting ink circuit on to a solidified surface whereby a voltage potential is applied to the circuit and the circuit heats, the substrate melts from a solid phase to a molten phase. Waxes, paraffin, thermal switching mediums such as Interlemer™ compounds (Landec Corp.), natural substances, such as bee's wax, low melting plastics, and the like, can be utilized. Thermochromic, photochromic, thermoluminescent or other chromic change agents can be embodied into the solid to liquid medium to pronounce the change or substrate destruction event. Message deconstruction can be used to create transient or on-time messages which self-destruct immediately upon message recognition.

Self-destruction substrates and messages can be used for product applications where the product producer wishes to temporarily display a message or image for advertising or promotional purposes, but then eliminate the embodiment so that the purchaser, if interested, will ultimately need to purchase a non-self-deconstructing version. Products such as games, toys, compact discs, consumer items, samples, and the like may find use for the embodiment by way of example.

Reversible and irreversible versions can be created depending on the application of interest. Reversible messaging can be employed where it is desirable to continuously cycle or reuse the image or message of interest. For example, point of purchase signs or advertisements may have a continuous cycle usage for days or weeks to promote a product. In this case, it would be desirable to utilize a reversible thermochromic or luminescent material which can be repeated during usage. In another example, it may be desirable to record a single message permanently. In this case, it would be desirable to utilize a thermochromically irreversible material which changes from one color to another giving rise to a permanent mEssage.

Conductive thermo-electric heating elements can be produced by a wide variety of means including standard printing processes such as pad printing, silk screen, flexographic printing, Gravier printing, off-set printing, marking, masking, painting, photolithography, etching, sublimation, metal stamping, dipping, scratching, polishing, engraving, CNC milling, extrusion, employing methods used for making printed circuit boards and any of a variety of other processes for producing patterns and images desired to create flash images and messages.

Chromic agents can be comprised within the conducting ink, layered above the ink, laminated distal to the ink (but still in thermal contact), layered behind the ink (but visible and in thermal contact with the ink), or in any practical configuration which provides an appropriate visual display.

Alternative heating/cooling elements can be used for creating flash images induced by heating or by chilling. For example, Peltier plates can be used which can be polarized to heat on one side and cool on the other side. The electrical polarity can be instantly reversed to cool on the original heating side and heat on the original cooling side. The process can be repeated to create various color effects in the flash image. It is desirable to utilize chromic change agents which respond to both heating and cooling by color change, color hue change, color intensity change, light emission level change or the like. Both thermochromic and thermoluminescent materials or like-kind materials can be employed.

Thermally conductive circuits for creating flash images can also be made by passing a hot or cold liquid or gas through a patterned circuit which is in thermal contact with the chromic change layer. Fluid or gas circuits can be used as alternatives to thermoelectric heating elements to eliminate the need for attaching electrical leads.

Color change and/or luminescent materials can include but are not limited to photo-luminescent material such as glow-in-the dark complexes such as zinc sulfide (copper doped from Hanovia Corp.), polydiacetylenes, polythiophenes, leucodyes, vinylphenylmethane-leucocynides and derivatives, fluoran dyes and derivatives, thermochromic pigments, micro and nano-pigments, molybdenum compounds, doped or undoped vanadium dioxide, indolinospirochromenes, melting waxes, encapsulated dyes, liquid crystalline materials, cholesteric liquid crystalline materials, spiropyrans, polybithiophenes, bipyridine materials, microencapsulated, mercury chloride dyes, tin complexes, combination thermochromic/photochromic materials, heat formable materials which change structure based on temperature, natural thermochromic materials such as pigments in beans, various thermochromic inks sold by Securink Corp. (Springfield, Va.), Matusui Corp., David Liquid Crystal Crop., or any acceptable thermochromic materials with the capacity to report a temperature change or can be photo-stimulated and the like. The chromic change agent selected will depend on a number of factors including cost, material loading, color change desired, levels or color hue change, reversibility or irreversibility, stability, and the like.

Polydiacetylenes comprising reversible and irreversible color change forms could be used alone or in combination with stationary dyes to create various transient or permanent images. Polydiacetylenic materials can be used alone or in combination with other thermochromic, photochromic, luminescent, or other optical change agent. The combination utilized will depend on the application of interest.

The thermo-luminescent and thermochrornic imaging process could be enhanced by varying the thermal triggering properties of the luminescent or the thermochromic material, the cross-sectional dimensions of the printed circuit to increase or decrease the circuit temperature, the voltage/power source and ancillary printed mediums in and around the printed message to be displayed.

Inks and coating materials can be modified to contain various concentrations of optical change agents. Optical change agents and stimulating agents can be present in a toothpaste matrix from greater than 50% to as low as 0.01%. More usually the agents will be present at 50% to 0.1%. Typically, the agents will be added at between 25% and 0.5% and most often between 10% and 1%. The application of interest, desired coloration, dye or pigment intensity and optical density, type of optical change agent, and costing considerations help in determining the concentration to be used.

As indicated above, a variety of optical agents find use in the subject invention. Thermochromic materials can be utilized including but not limited to: light-induced meta-stable state in a thermochromic copper(II) complex (Chem. Commun., 2002, (15), 1578-1579) under goes a color change from red to purple for a thermochromic complex, [Cu(dieten)2](BF4)2 (dieten=N,N-diethylethylenediamine); encapsulated pigmented materials from Omega Engineering Inc.; bis(2-amino4-oxo-6-methyl-pyrimidinium)-tetrachlorocuprate (II); bis(2-amino-4-chloro-6-methylpyrimidinium)hexachlorod-icuprate(II); cobalt chloride; 3,5-dinitro salicylic acid; leuco dyes; spiropyrenes, bis(2-amino-4-oxo-6-methylpyrimidinium)-tetrachlorocuprate(II); bis(2-amino-4-chloro-6-methylpyrimidinium)hexachlorod-icuprate(II); cobalt chloride; 3,5-dinitro salicylic acid; leuco dyes; spiropyrenes, bis(2-amino-4-oxo-6-methylpyrimidinium)tetrachlorocuprate (I) and bis(2-amino-4-chloro-6-methylpyrimidinium) hexachlorodicuprate(II), benzo- and naphthopyrans (Chromenes), poly(xylylviologen dibromide, di-beta-naphthospiropyran, Ferrocene-modified bis(spiropyridopyran), isomers of 1-isopropylidene-2-[1-(2-methyl-5-phenyl-3-thienyl)ethylidene]-succinic anhydride and the Photoproduct 7,7adihydro-4,7,7,7a-tetramethyl-2-phenylbenzo[b]thiophene-5,6-dicarboxylic anhydride, and the like. Encapsulated leuco dyes are of interest since they can be easily be processed in a variety of formats into a plastic or putty matrix. Liquid crystal materials can be conveniently applied as paints or inks to surfaces. Various cholesteric and non-cholesteric liquid crystal materials can be utilized.

Photochromic dyes can find use in a variety of color change mediums and formats. Photochromic materials can include but are not limited to dyes including: 1,3-Dihydro-1,3,3-trimethylspiro[2H-indole-2,3'-[3H]phenanthr[9,10-b](1,4)oxazine]; bicyclo [2.2.1] hepta-2,5-diene; benzyl viologen dichloride; 4,4'-bipyridyl; 6-bromo-1',3'-dihydro-1',3',3'-trimethyl-8-nitrospiro[2H; 5-chloro-1,3-dihydro-1,3,3-trimethylspiro[2H-indole-2,3'-(3H)naphth[2,1-b](1,4)oxazine]; 6,8-dibromo-1',3'-dihydro-1'3',3'-trimethylspiro[2H; 1,1'-diheptyl-4,4'-bipyridinium dibromide; 1',3'-dihydro-5'-methoxy-1',3',3'; 1',3'-dihydro-8-methoxy-1',3'3'-trimethyl-6-nitrospiro[2H]; 1',3'-dihydro-1'3',3'-trimethyl-6-nitrospiro[2H-1-benzopyran-2,2'-(2H)-indole]; 1,3-dihydro-1,3,3-trimethylspiro[2H-Indole-2,3'-[3H]naphth[2,1-b][1,4]oxazine]; 1,1'-dimethyl4,4'-bipyridinium dichloride; 5-chloro-1,3-Dihydro-1,3,3-trimethylspiro[2H-indole-2,3'-(3H)phenanthr[9,10-b](1,4)oxazine]; 5-methoxy-1,3,3-trimethylspiro[indoline-2,3'-[3H]naphtho[2,1-b]pyran]; 2,3,3-trimethyl-1-propyl-3H-indolium iodide, (E)-dicyclopropyl-(2,5-dimethyl-3-furylethylidene)succinct anhydride and the like.

Photo-luminescent compounds can find use in a variety of color change mediums and formats. Photo-luminescent compounds can include but are not limited to a variety of materials. Greens, green blue and violet can be made with alkaline earth aluminates activated by rare earth ions. By way of example, strontium aluminate can be activated using europium (SrA103:Eu). Visual wavelengths can include: green at 520 nm, blue-green at 505 nm, and blue at 490 nm. Red and orange colors can be generated with are zinc sulfide.

Darker or black thermochromic dyes find interest when used in combination with a photo-luminescent pigment. The photo-luminescent component is highly obscured when the substrate is cool. When the circuit is activated and the substrate flash heated, the optically opaque dark thermochromic pigment appears lightened and more highly light transmitting. Simultaneously, the photo-luminescent/thermo-luminescent pigment is heated and initiates light emission. The imparted optical effect is that of a more highly contrasted light emission in the dark and a thermochromic color change in the lighted environments.

Photo-luminescent optical effects can be enhanced or modified by printing the photo-luminescent material on various lightly colored or intensely colored backgrounds. The photo-luminescent can be brightened when the background is light. The effect can be more highly contrasted when the background is black. Colored backgrounds can provide color enriched or enhance light outputs in the dark. Thermo-luminescent/photo-luminescent pigments can independently be colored with dye materials or the dye material can be a part of the printed-paper or substrate that is being utilized for a flash imaging circuit.

Photo-luminescent/thermo-luminescent effects in flash imaging circuits can be amplified by initially charging the photo-luminescent/thermo-luminescent coating on a flash imaging circuit with an appropriate light source. By way of example, an ultra violet light can be used to initially illuminate the photo-luminescent/thermo-luminescent coating to provide an after glow effect. In day light, the glow is minimal, however when the flash imaging circuit is immediately initiated, the photon output from the flash imaging circuit is several fold greater than if the photo-luminescent/thermo-luminescent coating had not been initially illuminated with light. The optical illumination/amplification process provides a convenient means to increase the optical output efficiency and hence the product application range for the invention.

Pre-illumination can be utilized to enhance the optical illumination level of a thermo-luminescent/photo-luminescent flash imaging circuit. Initially, a flash imaging circuit can be light activated to a "glow-in-the-dark" state. When the flash imaging circuit is connected and heated, the optical output is significantly and visually increased relative to the optical output of a circuit that had not been pre-illuminated. Pre-illumination can be achieved by any of a variety of light sources including incandescent and fluorescent lights, flash lights, light emitting diodes, blue light emitting diodes, white light emitting diodes, green light emitting diodes and particularly ultra violet light emitting diodes (400 nanometers).

Fluorescent dyes can find use in various product applications and mediums and formats. Fluorescent dye compounds can include but are not limited to: fluorescein, fluoresceine, resourcinolphthalein, rhodamine, imidazolium cat ions, pyridoimidazolium cat ions, dinitrophenyl, tetramethylrhodamine and the like. A wide range of fluorescent dyes that can be activated at various wavelengths and emit light at lower wavelengths can be purchase from Sigma-Aldrich (Saint Louis Mo.) or Molecular Probes (Eugene Oreg.).

Fluorescent dyes can be printed, marked or co-coated along with photo-luminescent/thermo-luminescent flash imaging pigments and substrates. Fluorescent dyes can be applied by felt tip markers and highlighters used for stationary and marking. Fluorescent dyes can be used in combination with ultra-violet light excitation of glow-in-the-dark photo-luminescent/thermo-luminescent coatings. By way of example, a photo-luminescent/thermo-luminescent flash imaging substrate can initially be marked with a fluorescent maker (bright yellow/green, Sanford brand or Avery brand). The marking can be directly over an underlying flash imaging heating element. Subsequently, an ultra-violet light emitting diode penlight can be used to illuminate the fluorescent mark. In the dark, the fluorescent mark will appear dark compared with the glowing background caused by charging with the ultra violet light. When the flash imaging circuit is charged electrically, the thermo-luminescent/photo-luminescent can subsequently generate a further super-imposed image. The multiple simultaneous effects can be repeatedly cycled.

Other optical pigments and dyes can be incorporated into flash imaging substrates, coating compositions, and inks. By way of example, dyes used in creating organic light emitting diodes (OLED) can be combined alone or in combination with a thermochromic, photochromic, or thermo-luminescent/photo-luminescent materials to generate various optical effects. OLED compounds include but are not limited to: green polymeric emitter poly[(9,9-dihexylfluoren-2,7-diyl)-co-(N,N'-diphenyl)-N,N'-di(p-butylphenyl)-1,4-diaminobenzene]; blue emitter lithium tetra(2-methyl-8-hydroquinolitano)boron; blue green polymeric emitter poly[(9,9-dihexylfluoren-2,7-diyl)-co-(N,N'-diphenyl)-N,N'-di(p-butylphenyl)-1,4-diaminobenzene]; blue emitter 4,4'-(Bis(9-ethyl-3-carbazovinylene)-1,1'-biphenyl; red OLED phosphorescent metal complex dye bis(dibenzo[f,h]quinoxaline)(acetylacetonate) iridium(III) and tris(1-phenylisoquinoline) iridium (III).

Organic photoconductors including but not limited to: benzidines, fluorenes, hydrazones. triazoles, quinones and thiopyran dioxides, triphenylamines; P-Diethylaminobenzaldehyde-N,N-diphenyl-hydrazone and 9-Dicanomethylene-2,4, 7-trinitrofluorene can be incorporated into flash imaging substrates, coating compositions, and inks. Likewise, sensitizers and other optical pigments may find use including: croconines, perylenetetracarbonxylic acid amides, phthalocyanine, porphines, squarines.

Piezochromic dyes may find use in flash imaging circuits due their unique physical characteristics. By way of example, piezochromic photochromic dyes can include, but are not limited to: (E)-5-dicyanomethylene-3-[1-(2,5-dimethyl-3-furyl)ethylidene]-4-diphenylmethylene-tetrahydrofuran-2-one and related photochromic compounds (Abdullah M. Asiri, Alison Cleeves and Harry G. Heller, J. Chem. Soc. Perkin I, 2000, 2741).

Piezoelectric materials can be used in combination with optical change agents where the electrically induced structural disturbances caused during a piezoelectric process can promote a color change in thermochromic or mechanochromic materials (U.S. Pat. No. 6,607,744). Piezoelectric circuits can be printed according to process described in the examples below. Flash imaging can be accomplished by using electrically conducting piezoelectric materials printed in a flash imaging circuit. Piezochromic dyes can be used in combination with the piezoelectric material or dyes can be coated over the piezoelectric circuit. Piezoceramic materials, piezopolymeric materials, and piezoelectric crystals may all find use.

Tribochromic dyes can also find use in flash imaging circuits. They may be used alone or in combination with other optical change agents to produce a representative optical change result. Tribochromic compounds, exemplified by 3-dicyclopropylmethylene-5-dicyanomethylene-4-diphenylmethylenetetra-hydrofuran-2-one (Abdullah M. Asiri, Harry G. Heller, Micheael B. Hursthhouse and Alexander Karalulov, Chem. Comm, 2000, 799.) exhibit mechanical optical change effects that can find use alone or in combination with other chromic change agents.

In certain embodiments, agents are chosen tha that provide for multi-optical flash imaging. Photochromic agents can find dual use as being both photochromically active and thermochromically active. Photochromic agents can exhibit an initial color change from a colorless state to a colored state. In the photo-activated colored state, the colored state can be reversed to a colorless state by submitting the photo-activated colored material to an elevated temperature (e.g. from room temperature to 150° F.). Certain dual photochromic and thermochromic agents can exhibit either reversible effects, irreversible effects or a combination of reversible and irreversible optical effects. By way of example, diacetylenic material can exhibit an initial ultra violet light photochromic conversion from a colorless monomeric composition to a colored polymeric composition. The photochromic effect is irreversible. The corresponding colored polydiactylenic composition can exhibit either a reversible thermochromic effect or an irreversible thermochromic effect. Likewise, other traditional photochromic agents may exhibit both reversible photochromic and thermochromic effects.

Combinations of optical effects can also be achieved on flash imaging surfaces whereby one or more optical effects can be achieved. By way of example, a surface can be printed with a thermochromic pigment that changes from a colored appearance to an uncolored appearance when a flash imaging circuit is charged and heated. The surface can also contain a photochromic pigment that can be illuminated with a corresponding wavelength to photo-chromically change color to the intended illuminated photochromic colorant. Likewise, thermo-luminescent glow-in-the-dark pigments can be added to thermochromic ink base such that a color can be both changed and light emitted at the point of charging and heating a contacting conducting flash imaging circuit. Iridescent pigments, florescent pigments and other pigments can also be added along with those components that have a optical effect. Below illustrates a matrix by way of example but not limitation as to how various permutations of flash imaging optical outputs can be utilized alone or in combination with others:

| Thermochromic | Photochromic | Photo-luminescent | Iridescent |
|---|---|---|---|
| X | | | |
| | | X | |
| X | X | | |
| X | | X | |
| X | | | X |
| X | X | X | |
| | X | X | |
| | X | X | |
| X | | X | X |
| | X | X | X |
| X | X | X | X |

Thermo-luminescent, thermochromic flash printing and messaging find a multiplicity of uses in toys and games in general, commercial printing and advertising, consumer products, circuit testing, educational toys and mediums, flash cards, interactive learning tools, computer games, playing cards, business cards, greeting cards, books, magazines, activity toys, drawing toys, mailing and advertising, shipping and postal labels, security materials security badges, theme park tickets, audience tickets, security passes and the like where messages can be conveniently revealed for the purpose of adding new information, security and play value to the user.

Thermo-luminescent and photo-luminescent imaging can be further embodied with an optical element that can serve to photo-quench or de-illuminate a photo-activated substrate. By way of example, glow-in-the-dark inorganic materials can exhibit phosphorescent illumination when exposed to a light including from short wave ultra-violet light (250 nanometers) to longer wave lengths up to and above orange light (550 nanometers). Inorganic phosphorescent materials can be stimulated with photo-flash bulbs, flash lights, UV and standard LED's, incandescent lighting, fluorescent lighting and the like. Patterns or illuminated regions stimulated with the appropriate light can also be optically quenched using narrow band long wave light either from a monochromatic source such as a red solid state laser or red optically filtered light. Dark patterns can be drawn, printed, photo-masked or generated in photo-luminescent regions of a substrate containing an inorganic phosphorescent material by simply pulsing and/or focusing a red light source onto the luminescent area. The red light exposed area or design immediately and visibly darkens relative to non-red light exposed regions.

Thermo-luminescent regions stimulated by a thermal pulse can likewise be photo-stimulatively quenched using red light sources. Messages created using thermo-electric circuits imprinted on substrates comprising a photo-luminescent material can also be modulated and quenched using red light sources.

The thermal and optical properties of the embodiment can be combined with aromatic, pharmaceutical, or medicinal agents such that the heating and color change processes can be used to release an agent of interest from the substrate that the embodiment is comprised of. For example, a medical bandage can be printed with a electrical heat conductive circuit and over printed with a thermochromic material for revealing the design of the electrically conductive circuit when a voltage is applied. The medical grade adhesive can contain a pharmaceutical agent which is entrapped in the substrate. When electrically conductive heating occurs, the pharmaceutical agent can defuse from the substrate and permeate into the wound that the wound dressing is applied to.

Printed medical grade wound dressings for temperature regulation, monitoring, adhesive release, programmed temperature dependent agent release, accelerated healing, selective temperature dependent therapy, contact temperature cycling, improved circulation, warning indications, feedback systems for monitoring, and the like. For example, a medical grade adhesive tape can be printed with a conducting ink circuit on the non-adhesive side or a flexible medical pressure sensitive adhesive. The circuit can be printed in a pattern representing a message such a Releasing Drug Now. A temperature activated therapeutic drug can be comprised in the adhesive layer such that thermal stimulation will release a part or all of the drug to tissue contacting the medical adhesive. A thermochromic material can be over-printed onto the conducting circuit such that it obscures the circuit until a voltage is applied to the circuit. Upon application of a voltage to the circuit, the circuit will resistively heat illuminating the embedded message as well as thermally activating drug release from the adhesive layer to the epidural layer contacting the adhesive.

Other configurations can be used with the system to facilitate adhesive release from skin. In this case, a thermally active component in the adhesive layer can be stimulated by thermal elevation from the circuit. Likewise, both a message such as Safe To Remove can be made to appear indicating that the adhesive layer can be easily removed without skin irritation.

Flash messaging/image formation can be accomplished in using sequential or overlapping frame formats. For example, a thermally conducting circuit can be made such that the circuit contains advancing frame sequences or tiles. The frame images can be of an spatially or time resolved sequence such as a series of instructions, learning information, a cartoon, a series of clues for a game, or the like. The circuit can be designed such that each frame is connected and only one contact point needs to be made with one polarity of the connecting power source while the other polarity is permanently connected to each of the electrically conducting heating elements within the circuit. Once a thermochromic or thermoluminescent layer is placed over the circuit, the circuit itself will be obscured. The embodiment should be constructed such that one polarity is easily connected to a power source and illumination of each sequential image is accomplished by contacting a lead to an available bus-bar to close the circuit and induce heating for a particular frame.

Sequential flash imaging can be accomplished in card, sheet, page, note, business card or a variety of other sizes and shapes. Sequential frame of images can be designed to create the effect of motion or linear sequences of information materials such as written instructions. The thermochromic or thermoluminescent material can be in a plain form or likewise be printed with images or informational material. An orchestrated visual effect can be accomplished by overlaying an image printed with a chromic change material onto a circuit designed to illuminate features within the overlaid image. Upon application of an appropriate voltage to the circuit, an image can be made to visually change from an initial output to a final output. The flash image or message change can be reversible or irreversible.

Since the embodied mediums can be used for generating a variety of informative and visual displays, thermo-luminescent and thermochromic flash printing and messaging can be used to create novel and creative outputs for batteries. Designer displays can be created which visually communicate important exclusive information from the battery manufacturer. For example, flash displays can be used for brand reinforcement or revealing sweepstakes information. Likewise, embedded messages can be used for entertainment value for the battery or to reveal different utilities for a battery. Designs can be embedded or created which add play-value to a conventional battery in ways which can be used to create actual play toys out of the battery itself. Designs can be created or embedded within the battery periphery such that once the battery has outlived its initial intended use, it can be further used as a means to display embedded messages which can be visualized even with low remaining potential.

Interactive flash imaging display embodiments can be used to create attractive new designs which illustrate a combination of branding, co-branding, motion, sequential graphic states, various illumination geometries and the like. The battery tester becomes a branding and entertainment item as well as being an indicator. Its plurality of states and utility make it different from any existing product. Interactive color displays can be created, graphic frames can be changed, and promotional messages can be revealed and/or manipulated thorough one or more multiple states. The tester can become as much a "toy" or "delivery vehicle" for branding as well as a charge status meter.

A variety of temperature sensitive color-shift agents can be employed. The agents can be reversible or irreversible. The agents can be a part of the battery case or separate. The agents can come on game cards, attachment items, plug in pieces, or be printed on the battery graphic. The agents can be monochromatic or have different spectral hues for various coloring effects. The agents can have one or more temperature settings.

The entire side casing or periphery of a battery can be designed to comprise a graphic or visual display rather than a limited test strip which only indicates remaining power. Display information can be designed such that other useful information can be communicated to the user such as that the battery is placed incorrectly into a device intended for use. Information in a display casing on a battery can be used in conjunction with selected products which are intended to be used with only certain batteries manufactured. For example, a message on a product may be intentionally incomplete such that the remaining portion of the message is on the battery. Only by using a specified battery with a specified product, will the full message be revealed.

Toy makers can find use in visual display or designer batteries. Toys can be designed to only adapt or display messages important to the utility of the toy. The messaging battery can be important to provide additional visual function to the toy extending both the play value of the toy as well as the intended play value of the battery.

Transient flash imaging can be accomplished in viscous and non-viscous liquid mediums. Thin flexible sealed windows comprising a chromic change agent can be placed over an thermoelectric heating element. Transient heat generated by the heating element can be directly transferred to the fluid medium in the pattern of the element. Regions heated result in image formation in the fluid medium corresponding directly with the heating element geometry. The chromic change agent should be present at a concentration such that the heating element and supporting substrate are obscured. Visual resolution can be maintained by limiting the thickness of the fluid layer and thickness of the material comprising the sealed window containing the chromic change agent. The chromic change agent can be present from 0.1% by weight of the fluid to 99%. More usually, the chromic change agent is present from 0.5% to 90%. Typically, the agent is present from 1% to 50% and most often from 5% to 25%.

Liquids used to formulate the medium can be aqueous, oils, solvents, gums, waxes, polyethylene glycols, mineral oils, high temperature boiling point solvents, natural liquid substances, liquid polymeric fluids, vacuum pump oils, liquid detergents, cooking oils, natural liquid extracts, silicon oils, and any suitably temperature stable viscous or non-viscous fluid which provides stability good dispersion of the chromic change agent.

Thermally induced flash imaging in liquid mediums can be accomplished by contacting or integrating thermally conducting circuits with entrapped fluids comprising a thermochromic compound. Concentrations of thermochromic pigments can range from 50% to 0.5%. More usually concentrations will range from 25% to 1% by weight. Typically, concentrations will range from 10% to 1%. So long as the entrapped fluid layer is relatively thin heat generated from the electrically conducting—heat generating flash imaging circuit, the thin fluid thermochromic layer can be made to change color locally along a circuit line in response to a conductive heating event. Fluid layers for thermochromic flash imaging can range from 0.1 millimeter to 10 millimeters in thickness. More often fluid layers will range from 0.5 millimeters to 5 millimeters thick. Typically, fluid layers will range from 1 millimeter to 3 millimeters in thickness. The layer thickness will be dictated by the specific design embodiments for a product application of interest.

Photo-induced flash imaging in liquid mediums can be accomplished by incorporating photochromic pigments, glow-in-the-dark pigments or combinations there of into fluid layers. Concentrations of pigments can range from 50% to 0.5%. More usually concentrations will range from 25% to 1% by weight. Typically, concentrations will range from 10% to 1%. Fluid layers for photo-induced flash imaging can range from 0.1 millimeter to 10 millimeters in thickness. More often fluid layers will range from 0.5 millimeters to 5 millimeters thick. Typically, fluid layers will range from 1 millimeter to 3 millimeters in thickness. The layer thickness will be dictated by the specific design embodiments for a product application of interest. Optical polymer gels may be utilized in flash imaging circuits involving transient fluid optical imaging: (Polymer gel light-modulation materials imitating pigment cells (Advanced Materials, 14, 1808-1811, (2002)).

Products and applications incorporating flash imaging can include but are not limited to micro-miniature flash imaging items (micro-sensors or chips) to large-scale flash imaging items (bill boards). Example sizes item incorporating flash imaging can range in size from 1 micron to 10 meters or more. More usually, items will range in size from 10 microns to 1 meter in size. Typically, items will range from 1 centimeter to 100 centimeters and most often from 5 centimeters to 50 centimeters.

Solid-liquid transformation flash images can be prepared using solid film layers comprised with a chromic change agent and a thermally sensitive medium which melts from a solid phase to a fluid phase when heat is conducted from a contacting heating element. The configuration can further provide an additional pluralistic effect since an image can both be produced initially by the optical change effect and additionally by a localized solid-liquid transition induced in the medium.

Flash imaging of the subject invention can also be used in sensing, warning and alert applications. Flash imaging substrates, devices, and outputs can be used as reporting means for sensing, warning, and alert applications. Flash imaging can be used passively where the output message is simply sent signals from a remote sensing, warning, or alerting device or it can be active where the flash imaging device is integral to the sensing, warning, or alerting mechanism. In either case, single or multiple flash imaging outputs including thermochromic, thermochromic/photochromic, and thermo-luminescent/photo-luminescent outputs can be utilized depending on the application of interest.

In cases where the flash imaging output is passive, an independent or remote signal developed in response to a sensing, warning, or alert mechanism can be generated and sent to a responding electronic element coupled to a flash imaging circuit. The flash imaging circuit can be used as a display that indicates to an observer that a signal has been generated. A flash imaging circuit can find a variety of uses for signaling and displaying information with an affordable means compared to more costly liquid displays, panel displays, electro-luminescent displays or the like. Likewise, flash imaging can be used to display significantly more information compared with simple light sources, color changes, or other analog outputs.

For example, a flash imaging circuit can be used to report a signal output from alarm processes such as those used for radio wave frequency identification tags (RFID). A signal output can be transmitted from the RFID tag to a flash imaging circuit to generate a visual output that an item has breached a storefront inadvertently. A flash imaging device can be used as an output means to report temperature recorded by a digital thermometer. Flash imaging outputs for temperature monitoring can be used in a variety of ways including: automotive performance monitoring, outdoor temperature, indoor temperatures, oven temperatures, cooking temperatures, temperature extremes that children may be inadvertently be exposed to such high temperature reached on parked cars during summer months or the like.

Flash imaging can be used as a low cost and reliable readout means and an inexpensive alternative to computer displays, liquid crystal displays, light emitting displays and the like. Flash imaging can be used as a simple analog readout mechanism for instruments, equipment, machines, devices such as thermometers, warning signs, instrument panels, automotive dash boards and the like. By way of example, flash imaging can be used as means to display a temperature measurement derived from a related planar circuit such as the RFID or passive radio wave frequency tags (RF) described above. An RF tag can be used as a temperature-monitoring device in that its ability to act as a radio wave frequency antenna is a function of its electrical conductivity and related characteristics. If the RF tag is subjected to increased temperatures, its conductivity will decrease rendering it unable to function the same as at lower temperatures. The differential response can be used as signaling means to an interpreting circuit that a specific temperature has been achieve provided that the RF circuit was designed for to give a differential signal at the anticipated temperature.

Flash imaging can be conveniently used as a compatible analog visual output for indicating that a desired temperature has been achieved. The RF circuit can be miniaturized and utilized within a food type being cooked. The cooking process can proceed with the RF tag internalized in the food type. The RF tag will continue to respond during cooking until a specified internal cooking temperature has been achieved. At that point, the RF tag will undergo a differential conductivity and change its signal output. The signal output can be interpreted as that the desired cooking temperature has been achieved. A flash imaging circuit external to the cooking process can be used as a visual readout means to report that cooking has been completed.

In cases where the flash imaging out put is active, the flash imaging event can be directly coupled or a part of the sensing, warning, or alerting mechanisms. By way of example, active flash imaging circuits can be used as novel battery testers where the flash imaging circuit can directly report the charge level of a battery. For battery testing applications, producers would no longer be limited to a simple color change, but could instead generate light pulses through the use of photo-luminescent/thermo-luminescent coatings. Likewise, flash imaging circuits can be used to generate comprehendible messages rather than simple lines or marks.

Active flash imaging circuits can be comprised with chromic change agents that are responsive to particular environmental conditions. By way of example, photochromic/thermochromic active pigments can be used in a flash imaging circuit such that the circuit exhibits no messages until exposed to sunlight. Upon exposure to sunlight, the photochromic pigment becomes colored and the flash imaging circuit can be revealed due to the now present photo-induced color formation. Alternatively, photo-conducting polymers can be integrated into a flash imaging circuit such that the circuit is complete upon exposure to light resulting in conductivity, heating and subsequently a flash imaging/messaging output.

The following examples are offered by way of illustration and not by way of limitation.

EXPERIMENTAL

Part A.

Example 1

Electrically conductive circuits containing fine heating element lines were printed on the reverse side of papers using a silk screen printing process. Papers used were plain and uncoated, ink jet photo quality papers, papers printed with thermo-luminescent materials (glow-in-the-dark), papers printed with reversible or irreversible thermochromic materials and the like. An electrically conductive silver paste ink (DuPont 5026) was used for printing. A standard mesh screen printing frame and material was photo etched to create conductive circuit designs (240 mesh). Wording, graphics or other visual outputs were first prepared in a positive format. Line meant to be used as heating elements were made thin (1 millimeter). Connecting elements not meant to be seen were made broad (5-10 millimeters). The positive image was submitted to a silk screen manufacturer and images in the positive form were etched as requested into a standard frame/screen. After screen printing, the printed medium was dried in an oven for five minutes at 200° F. or at room temperature over night.

Example 2

Thermo-Luminescent flash image/word illumination on paper substrate: An inexpensive thermo/photo-luminescent display was printed on a substrate, paper or any convenient printable substrate can be used. For the purpose of the current application, standard photocopy paper stock was coated with a photo-luminescent iron complex. The complex was in a fine mesh powder form and coated using a binder on the paper stock. Commercially available glow-in-the-dark papers could also be used (purchased at Office Depot). The coating thickness and luminosity was adjusted such that the luminescent pigment was marginally visible (glow) after exposure to ambient light.

The word "COOL" was etched into the silk screen assembly. The circuit was printed as in Example 1 such that discrete letters could be visualized without seeing the letters when illuminated yet still maintaining complete electrical connectivity along the printed message from beginning to end. Wide-print lines (five times width) were printed between connecting letters such that primary heating would only occur on the imaged letters.

The work "COOL" was illuminated by connecting the circuit at buss bars terminated at each end of the word. A battery was connected to the buss bars such that electrical conductivity was made. Instant thermal heating along the printed letters resulted in forming the image "COOL" on the luminescent side of the paper. The image was visible under normal lighting conditions and was bright under reduced light conditions. The thermo-luminescent image was pulsed to achieve maximum effect.

(0.5-5 seconds). Prolonged heating resulted in image fading. The effect was highly reversible due to the thin insulating nature of the paper substrate. The image could be flashed on and off by electrical pulsing such that the word "COOL" flashed on and off in a repeating manner.

Example 3

Thermochromic pigment for adding to ink bases or direct addition to shape/memory compositions: A thermochromic pigment composition was prepared by adding a pre-polymerized polydiacetylenic dimeric amide. The dimeric amide was made from dimerizing the diacetylenic acid 5,7-dodecadiynoic acid with ethylene diamine such that two acid groups coupled with a single ethylene diamine to make the diamined. The dimeric amide was purified and polymerized to a stable pigment using ultraviolet light (254 nanometers). The material was readily powderized using a standard high-speed blade grinder. The powderized form could be readily added at various stages of processing of the shape/memory composite.

Example 4

Reversible thermochromic ink materials: A silk screen printing ink composition was prepared by adding a pre-polymerized polydiacetylenic dimeric amide. The dimeric amide was made from dimerizing the diacetylenic acid 5,7-dodec-adiynoic acid with ethylene diamine such that two acid groups coupled with a single ethylene diamine to make the diamined. The dimeric amide was purified and polymerized to a stable pigment using ultraviolet light (254 nanometers). The pre-polymerized diamide was added at a 10% by weight to a general purpose silk screen ink base (Nazdar Ink Corp.). The mixture was mixed to homogeneity and stored for use. At room temperature, the formulated ink appeared magenta in color. Upon cooling, the ink shifted its optical characteristics to a purple/blue color. Upon heating, the ink transitioned to a red/orange color. The formulated wet solvent based ink remained stable and exhibited reversible thermochromic characteristics at room temperature and only irreversibly turned color if heated above 150° F. The ink base when dried retained its reversible thermochromic color change ability up to 250° F.

Example 5

Flash thermochromic animated images on paper substrate laminates: A thermo-electric conducting circuit was prepared as in Example 1 where the desired element to be illuminated comprised 5 sequential images of a figure performing a cart wheel on the ground and an acrobatic move along a hanging bar. The circuit was designed such that all of the images were interconnected and grounded and each element could be individually addressed with a positive voltage connection adjacent to each sequential frame. The sequential image frame measured 6 inches by 5 inches, a convenient size for placement in a small book. The electrically conductive circuit was printed on to a light gray 80 pound paper stock. Paper substrates were printed with the thermochromic screen printing ink described in Example 4. Rectangular fill patterns were printed on to photo quality ink jet printing paper (Epson Photo Quality Ink Jet Paper) in a 5.5 inch by 6.5 inch block size. The block size was made slightly larger than the conductive ink image such that all of the elements of the conductive ink image could be obscured by the thermochromic overlay.

Once the thermochromic fill pattern was printed and dried, it was cut to overlap the conducting ink image. Small 0.25 inch in diameter holes were punched in positions precisely to match and expose the positive voltage busses when overlayed on the conductive ink circuit. The printed and hole punched thermochromic sheet was spray coated on its back side with a permanent pressure sensitive spray adhesive (3M Corporation). The thermochromic layer was carefully adhered over the conductive circuit and firmly positioned such that each animated element was obscured from view and that each electrical terminal was exposed for electrical contact with a power source.

Once the laminate was complete, the obscured sequential images could be thermochromically revealed by contacting the appropriate leads from a 9 volt battery to the positive and negative bus bars on the laminate. Each sequential frame could be exposed by quickly contacting each sequential positive connector one after another. The images generated appeared animated moving across the page as each electrical contact element was addressed. The image would rapidly dissipate when the electrical contact was broken.

Example 6

Reversible transient liquid crystal star-burst image: A thermoelectric conductive circuit was printed on 60 pound paper stock using the silk screen printing process described in Example 1. A pattern of a star burst using 7 pointed star was prepared. The line width of the image was 1 millimeter with 1 square centimeter bus bars for electrical contacts.

A pressure sensitive label with pressure sensitive material on one side of the label and a liquid crystal layer on the other side of the label was applied directly over the star bust pattern on the conductive ink circuit. Application of a 9 volt battery on the bus terminals of the circuit cause the starburst image to appear immediately. The liquid crystal material gave a spectral pattern paralleling the conducting lines immediately when the voltage was applied. The star burst pattern diffused back to a neutral background as the full element returned to ambient temperatures.

Example 7

Irreversible self-printing/revealing cartoon figure: A thermoelectric conductive circuit was printed on 60 pound paper stock using the silk screen printing process described in Example 1. A pattern of a cartoon image figure was designed such that the positive and negative electrical contacts were at the base of the figure. The image was comprised with 1 millimeter line widths and the electrical contacts each 1 centimeter square.

A pressure sensitive label printed with an irreversible thermochromic material was laminated over the cartoon image area leaving the bus terminals exposed for future contact. The pressure sensitive label was printed with a monomer composition ink containing 10% by weight 10,12-tricosadiynoic acid and 5% by weight 10,12-pentacosadiynoic dissolved in a solvent based nitrocellulose flexographic ink base. The printed, dried pressure sensitive ink was polymerized with UV light (254 nanometers) to a deep blue coloration. The printed polymerized label was adhered directly over the cartoon image. Application of a 9 volt battery on the bus terminals of the circuit caused the cartoon figure image to appear immediately. The heating process caused in irreversible color change from a blue color to a red/orange. The image remained well defined and permanent even after the voltage was removed.

Example 8

Flash imaging conceal and reveal book: A flash imaging/messaging book was prepared with multiple pages using the processes described in Examples 2 and 5. Combinations of thermochromic and thermo-luminescent flash pages were included throughout the book. Each flash imaging/animated page was electrically interconnected such that a single stylus pen can be placed in contact with discrete bus bars on each page. The circuit design provided for a negative ground electrical connectivity throughout the book. The stylus pen was enabled with a positive voltage interconnection. Each page could be turned without restriction and each bus bar on each page could be contacted with the stylus pen in any sequence. The pen had a loose 10-inch long cord for facile use.

Each page in the book had flash image/messages corresponding to a sequential story with both conceal and reveal pictures and wording. The pages were printed with either thermochromic or thermo-luminescent coating or both at specific locations on each page. Printing was accomplished such that each flash image or message was accompanied with normal text and graphics. The combination of normal text and graphics along with flash imaging and messaging provide for a novel book format which presented a combination of entertaining, interesting and challenging reading characteristics.

Example 9

Trading/greeting cards with flash imaging and messaging: Thermochromic and thermo-luminescent trading cards were prepared using the processes described in Examples 2 and 5. Cards were prepared in 2.5 inch by 3.5 inch formats. The bus bars were placed at the base of each card such that the card could be inserted into a dock in a device containing the necessary electrical circuits and power supplies to pulse the flash images and messages embedded in the card.

The device for receiving and illuminating the cards was a small hand held plastic fixture containing a battery, electrical leads for contacting the bus bars on the card, electrical circuits capable of pulsing an image, and supporting elements for structure and operation.

For operation, a card could be placed in the device port such that the bus bars made contact with the connecting leads in the device. A switch was turned on such that a battery was pulsed to supply the card heating elements. Electrical pulses sent to the card circuit resulted in sequential pulsed illumination of the embedded image. The circuit was supplied sequential 0.5 second pulses with a duration of 10 seconds duration between each pulse. The momentary delay between each pulse permitted time for the flash image to dissipate and the thermochromic image to revert to a blank background starting color.

Example 10

Additional Embodiments

Additional embodiments in which the subject flash imaging finds use include, but are not limited to: 1) Retail display using thermo-luminescent substrate; 2) Flash imaging on packaging; 3) Battery case thermoluminescent display image on 9 volt battery; 4) Reversible flash features revealed on 3-dimensional toy surface; 5) Multiple reversible thermo-luminescent image sequential frames; 6) Reversible sequential flash graphics/images on game board; 7) Touch contact flash imaging paper with opposing conducting contacts; 8) Flash imaging paper currancy and security checks; 9) Enhanced photographs with intrinsic flash imaging characteristics to modify appearance of printed pictures; 10) Plastic credit card with internalized flash imaging to signify identy and brands; 11) Magazine pages with embedded flash images which can be activated by a consumer; 12) Store front displays with poster sized flash imaging out-puts; and 13) Flash imaging road side bill boards for enhancing branding, marketing, and sales information.

Part B.

Example 1

Preparation of Conductive Heating Element Flash Imaging Substrates

A flash imaging circuit comprising an electrically conductive heating circuit, electrical busses for electrical contact and connection, and a responding optical layer is prepared in a layered form. The first layer is an electrically insulating substrate for supporting and preparing the electrically conductive heating element on. The second layer is the electrically conductive heating element prepared on and adhered to the substrate. The third layer comprises an optical layer that is used for generating a visual output for the flash image intended to be projected.

For preparation, an electrically conductive heating circuit is either screen printed using a conductive ink (silver based or carbon based), and subsequently dried. Alternatively, the circuit can be pad printed; stamped or embossed with an appropriately conductive heating element (silver, aluminum, nickel, nickel-cadmium, nickel-chromium or the like); embossed with films like those above; chemically etched; laser engraved; or prepared by another related convenient means.

Once an electrically conductive heating circuit has been prepared on a selected substrate, a representative optical output layer suitable for generating the visual image designed for outputting by the electrically conductive heating circuit is coated over the circuit so as to obscure the circuit and provide an acceptable optical effect. Optical mediums comprising the optical layer can include but are not limited to thermochromic dyes and liquid crystals, thermo-luminescent/photo-luminescent agents, combinations including related agents or other optical effect dyes and pigments that help to create a desired optical effect. The agents of interest will typically be added as pigments to an ink base such as an ultra violet curable ink or a solvent based ink.

For preparation, the optical output medium is typically printed by screen printing, flood coating flexographic printing, laminated on, thermally transferred, painted, adhered on a pressure sensitive surface or the like. The optical output layer should be positioned to cover all of the desired electrically conducting heating circuit, but remain clear of any electrical bus contact regions. The completed flash imaging substrate or device can be tried accordingly or used directly depending on the final design configuration intended for use.

For use, a completed flash imaging device is connected to a suitable pulsing power source that has been designed and adjusted to deliver an adequate alternating current or direct current necessary to create a heating pulse in the conducting/heating elements f the circuit. Care should be taken to avoid delivery of too high of power surges such that the circuit could cause over heating and breakdown.

Example 2

Thermochromic and Liquid Crystal Flash Imaging Game Boards, Game Pieces, and Puzzles Flash imaging circuits based on a thermochromic color change were integrated into a game board comprised with a thick 40 point chip board play board. Flash imaging designs were prepared using a silk screen printed conducting silver ink (conductor paste 5025 and/or 7282 and thinner 8210 where necessary, Du Pont Corporation, DE), a 35° C. thermochromic ultra violet curing ink (Matsui Corporation, CA), and or thermochromic liquid crystal inks or printed substrates (LCR Hallcrest, IL) using sequences described in the above example "Preparation of conductive heating element flash imaging substrates".

Screen printed conducting/heating elements were accomplished using a 190 mesh screen and dried at 170° F. for 10 minutes. Game board sizes were prepared using sizes ranging from 6 inches by 6 inches to 18 inches by 18 inches. Base chip board stock pieces were die cut according to measurements intended for a particular game being developed.

Game board, game piece, or puzzle graphics were printed on 80 pound coated stock paper using standard 4 color off-set printing processes. Games were pre-designed to exhibit the desired game layout as well as providing areas on the board that were intended to be in contact with the electrically conductive flash imaging circuits. These areas were left blank in order to be printed with a thermochromic ink intended to be utilized by the flash imaging component. Thermochromic overlays were screen printed in designated areas on the 4 color process printed material using a 190 mesh screen and semi-viscous ultra violet ink bases (dual pass). Printed thermochromic overlays were cured using a standard 1200 watt/inch squared medium pressure mercury vapor arc lamp.

Graphic overlays comprising the 4 color printed areas and thermochromic printed areas were laminated with a double sided laminating adhesive (3M Corporation). Overlay areas were trimmed and applied directly to the conductive ink printed game board stock. Care was taken to avoid air bubbles. Connecting electric bus bars were avoided such that the bus bars remained exposed for contact to a power and controller source. The flash imaging game board pieces were completed with necessary power sources and electronic control elements.

Example 3

Photo-Luminescent/Thermo-Luminescent Flash Imaging Card Pieces

Flash imaging circuits based on a photo-luminescent/thermo-luminescent optical change were integrated into playing cards comprised with a 15 point double coated paper. Flash imaging designs were prepared using a silk screen printed conducting silver ink (conductor paste 5025 and/or 7282 and thinner 8210 where necessary, Du Pont Corporation, DE) and a glow-in-the-dark ultra violet curing ink (Chromatic Technologies, Inc., CO) using sequences described in the above example "Preparation of conductive heating element flash imaging substrates".

Screen printed conducting/heating elements were accomplished using a 190 mesh screen and dried at 170° F. for 10 minutes. Card sizes were prepared using sizes ranging from 2 inches by 4 inches to 8 inches by 10 inches. 15 point paper stock pieces were die cut according to measurements intended for a particular game being developed.

Card game graphics were printed on 60 pound coated stock paper using standard 4 color off-set printing processes. Cards were pre-designed to exhibit the desired graphic layout as well as providing areas on the card that were intended to be in contact with the electrically conductive flash imaging circuits. These areas were left blank in order to be printed with the photo-luminescent/thermo-luminescent ink intended to be utilized by the flash imaging component. Thermochromic overlays were screen printed in designated areas on the 4 color process printed material using a 190 mesh screen and semi-viscous ultra violet ink bases (dual pass). Printed glow-in-the-dark photo-luminescent/thermo-luminescent overlays were cured using a standard 1200 watt/inch squared medium pressure mercury vapor arc lamp.

Graphic overlays comprising the 4 color printed areas and photo-luminescent/thermo-luminescent printed areas were laminated with a double sided laminating adhesive (3M Corporation). Overlay areas were trimmed and applied directly to the conductive ink printed card stock. Care was taken to avoid air bubbles. Connecting electric bus bars were avoided such that the bus bars remained exposed for contact to a power and controller source. The flash imaging game board pieces were completed with necessary power sources and electronic control elements.

Example 4

Flash Imaging on Wall Hangings, Signage, Posters, Menus, and Displays

Flash imaging printed display pieces were prepared according to the above examples "Preparation of conductive heating element flash imaging substrates", "Thermochromic flash imaging game boards, game pieces, and puzzles", and "Photo-luminescent/thermo-luminescent flash imaging card pieces".

Representative flash imaging circuits could be screen printed, pad printed, embossed, or otherwise laminated or adhered on to paper sheets or plastic films. Accordingly, electrical connections and bus bars for electrical contact may be over-coated or protected so as to minimize any external contact. Power sources and circuit designs must be developed according to the application of interest. Battery packs can be developed to comply with utility, power output, and connectivity. For on-going usage, flash imaging items can be conveniently connected to electrical tracks similar to the connections used for track lighting. In this manner, different pieces can be added or removed whereby the attaching electrical fixtures remain semi-permanent or permanent.

Display pieces can be designed and prepared such that they could be used for hanging on walls, on bed head boards, form or on ceilings, as retail display collateral, in offices, in homes, at airports, at stations, or any of a variety of locations where messages, graphics, or other information is to intended to be communicated. Photo-luminescent/thermo-luminescent bedroom displays can be used as night time entertainment and enjoyment for children. Sign displays can be used as interactive impulse buying or otherwise promotional material. Flash imaging can be uses as entertaining and interactive menus at restaurants or dining spots. Flash imaging posters can be used at movie theaters, airports, sporting arenas, conventions, convention show rooms, or other indoor or outdoor events where interactive messaging is important and adds value to a presentation.

Example 5

Plural Photochromic/Thermochromic Flash Imaging Substrates and Examples

Plural photochromic and thermochromic flash imaging substrates and embodiments were developed using compatible photochromic ultraviolet light curable ink bases. Photochromic ultraviolet light curable inks were evaluated for their dual ability to exhibit photochromism and subsequently, when photochromically colored, also possessed a thermochromic effect from a photo-induced colored state to a thermochromically induced colorless state. Commercial inks were screened and selected for those, which exhibited a dual effect (Chromatic Technologies, Inc, CO and Matsui Corp. CA).

Flash imaging circuits were prepared as described in the above examples: "Preparation of conductive heating element flash imaging substrates", "Thermochromic flash imaging game boards" and "Photo-luminescent/thermo-luminescent flash imaging card pieces". By example, available colors of photochromic ultraviolet light curable inks (Chromatic Technologies, Inc., CO) were printed on a heat stable plastic pressure sensitive label stock. The printed photochromic label materials were cut and adhered to pre-made flash imaging conducting circuits. Conducting electrical bus bars were left bare for electrical contact.

For use, the finished layered flash imaging device/substrates were initially uncolored at room temperature. A 400 nanometer ultraviolet light emitting diode pen was used to illuminate the photochromic ink surface. Upon illumination, the ink surface turned color in response to illumination to a deep blue, purple, orange, green, or magenta hue depending on the ink base used. While in the photo-induced colored state, the visual surface appeared deeply colored for a period of 10 to 30 seconds. The underlying flash imaging circuit was connected to generate a heat pulse in the printed conducting/heating element message. The message appeared in contrast to the photo-induced colored background. The photochromic effect was instantly turned to a colorless state directly along the flash imaging circuit and not on the surrounding areas. The thermochromic effect in the photochromic medium provided a multiplicity of applications for flash imaging as a multi-optical/electric system.

Example 6

Flash Imaging Integrated as a Temperature Monitoring Device for Attached Surface Printed line widths or thicknesses in flash imaging conducting/heating element circuits can be adjusted to provide set temperatures achieved during activation of the flash imaging process. Provided that the flash imaging circuit is placed in thermal contact with an appropriate mass, and provided that the cross-sectional dimensions of the conducting/heating element of a flash imaging circuit has been appropriately dimensioned, then the temperature/mass of the item that the flash imaging circuit is placed in contact with can be used to attenuate the resulting temperature achieve by the flash imaging circuit during an activation pulse.

Provided that the temperature of the item is kept at a specified low temperature, the resulting temperature achieved by the circuit can be kept to a minimum threshold too low to trigger a thermochromic effect in a thermochromic layer over coating the flash imaging circuit. Provided that the temperature of the item is kept just at or above the minimum threshold temperature necessary to trigger the thermochromic material, the thermochromic layer can be caused to undergo a thermochromic change thereby indicating that the threshold temperature has been achieved.

The flash imaging circuit can be printed using a message that represents the threshold temperature. By way of example, the message can indicate the actual temperature achieved. In case that it is desired to indicate that the threshold temperature in is in the range for keeping fresh food at a safe storage temperature (e.g. 45° F.), the flash imaging circuit could indicate "ABOVE 45° F.". If the temperature is kept below 45° F. the circuit, when activated, would not be able to develop a high enough temperature to trigger the coating thermochromic agent and no message would appear. The circuit could be selectively designed to develop a high enough threshold temperature at 46° F. to trigger the necessary change in the thermochromic coating such that the message "ABOVE 45° F." to appear.

Alternative examples can be created to generate various warning, signaling, reference, informative, educational and the like messages. One or more sequential messages can be designed into the flash imaging embodiment to enable different messages to be apparent at different pre-set temperature settings. Numerical, symbolic, graphic, written and assorted other message forms can be employed depending on the desired message to be communicated. Different temperature transitioning thermochromic agents can be utilized to create the messaging effect over a large temperature range. Different circuit designs can be employed to increase of decrease the circuit's sensitivity to the temperature impact.

Integrated flash imaging temperature monitoring devices can find use in a wide range of applications and industries including but not limited to: food and food processing; industrial processing; institutional food handling; medical applications such as wound care, medicinal storage conditions, specimen storage, operation conditions, patient monitoring, and organ storage; outdoor conditions and activities including sports; automotive performance monitoring; roadway conditions such as dangerous near freezing conditions; warning labels; health monitoring conditions such as hypothermia or excessive heat during aggressive play and activities as well as a range of other industries and product applications.

Example 7

Flash Imaging in Fluid Mediums with Reversible Transient Thermochromic, Photochromic/Thermochromic, and Thermo-Luminescent/Photo-Luminescent Printing in Flexible Encased Fluids A clear vinyl encased fluids comprising a thermochromic or photo-luminescent optical effect pigment and an aqueous solution was prepared as a transient printing, messaging, and activity unit. 5% by weight powdered thermochromic pigment (Keystone Aniline Corporation, Chicago Ill.) was utilized for a thermochromic version. 5% by weight powdered photochromic pigment (Color Change Corporation, Streamwood Ill.) was utilized for a photochromic/thermochromic version. 10% by weight powdered photo-luminescent pigment (Glow Incorporated, Severn Md.) was utilized for a glow-in-the-dark version.

The aqueous solutions were prepared by directly admixing the chromic change agents with water. Vigorous mixing was utilized when necessary to ensure complete suspension and uniformity. Mixtures were added to clear flexible vinyl pouches sealed on 3 sides (approximately 10 ml fluid, $5/1000$ inch thick clear flexible vinyl). The pouches were purged of air and completely sealed using a standard packaging heat sealer.

Pouches containing chromic change agents were adhered to flash imaging circuits prepared according to the above examples "Preparation of conductive heating element flash imaging substrates", "Photo-luminescent/thermo-luminescent flash imaging card pieces", and "Plural photochromic/thermochromic flash imaging substrates and examples". Tight direct contact was made between the thin fluid containing pouch and the flash imaging circuit. Concentrations of the chromic change agents were adjusted as necessary so as to ensure complete obscurity of the underlying flash imaging circuits. Alternatively, opaque colored vinyl could be used on the side of the pouch in contact with the chromic change circuit such that the chromic change agent concentrations could be effectively reduced.

Final encased thermochromic, photochromic, and photo-luminescent viscous solutions retained all of their optical properties respectively. When connected to an appropriate electrical power source, the underlying flash imaging circuit could be used to create transient images in the respective fluid mediums. The optical change versions provided a convenient surface for creating and writing messages, codes, symbols and the like that could be made to appear and then dissipate over several minutes. By way of example, the photochromic-encased version could be conveniently written on using a 400 nanometer light emitting diode pen light. Written matter immediately appears as the pen light passes over the encased surface. When the flash imaging circuit is connected the photochromic medium can exhibit a thermochromic image representing the printed flash imaging circuit. The written matter dissipates within 1-2 minutes or immediately by changing the shape or distorting the pouch surface. In all cases, the imaging method was completely reversible and could be re-used systematically.

Example 8

Reversible Tansient Flash Imaging in Encased Fluid Mediums on Rigid Consumer Products A clear plastic encased fluid comprising a thermochromic or photo-luminescent optical effect pigment and an aqueous solution was prepared as a transient printing, messaging, and activity unit. 5% by weight powdered thermochromic pigment (Keystone Aniline Corporation, Chicago Ill.) was utilized for a thermochromic version. 5% by weight powdered photochromic pigment (Color Change Corporation, Streamwood Ill.) was utilized for a photochromic/thermochromic version. 10% by weight powdered photo-luminescent pigment (Glow Incorporated, Severn Md.) was utilized for a glow-in-the-dark version.

The aqueous solutions were prepared by directly admixing the chromic change agents with water. Vigorous mixing was utilized when necessary to ensure complete suspension and uniformity. Mixtures were added to clear rigid sealed compartments in direct thermal contact with flash imaging circuits. Plastic compartments were typically made with transparent plastic on the outer layer and opaque plastic on the inner layer. Compartments were typically sealed with sealing adhesive, sonic welding or the like.

Sealed fluid flash imaging circuits were produced for various applications such as drinking mugs, cups, packaging, displays, fish tanks, interactive play toys and the like. Final encased thermochromic, photochromic, and photo-luminescent viscous solutions retained all of their optical properties respectively. When connected to an appropriate electrical power source, the underlying flash imaging circuit could be used to create transient images in the respective fluid mediums. The optical change versions provided a convenient surface for creating and writing messages, codes, symbols and the like that could be made to appear and then dissipate over several minutes.

Example 9

Optical Flash Imaging on Toys, Cups, Plates, Utensils Appliances, House-Hold, Toiletry and Other Consumer Products Various appliance, utensil, and other house-hold and consumer products find new use, utility, functionality, and value when incorporating a flash imaging substrate/output. Non-planar surfaces can be prepared and modified to contain a flash imaging element using methods described in the above examples "Preparation of conductive heating element flash imaging substrates" and "Thermochromic flash imaging game boards".

Representative flash imaging circuits could be screen printed, pad printed, embossed, or otherwise precision painted on to three-dimensional contoured surfaces. Accordingly, electrical connections and bus bars for electrical contact may be over-coated or protected so as to minimize any external contact. Power sources and circuit designs must be developed according to the application of interest. Battery packs can be developed to comply with utility, power output, and connectivity. Hand-held items with flash imaging circuits may have rechargeable battery pack for added convenience.

Flash imaging circuits printed on three-dimensional contoured surfaces can be used to create a variety of visual effects. On toys, the circuit can be used to change a visual feature of the toy. On cups, plates, and utensils, flash imaging circuits can be used for branding, monitoring, entertaining or otherwise informing a user of a desired message. On appliances, flash imaging circuits can be utilized to warn of overheating hazards, of timing (e.g. toasting bread), or otherwise creating an of a number of visual effects. On food storage containers, flash imaging can be used to indicate the type of included food or the duration of storage. On toothbrushes, flash imaging circuits can be used as a timing means to alert children of grownups of brushing duration times. On other consumer products, flash imaging can be used for any of number of visual outputs to create communication message to users.

Example 10

Flash Imaging Wires and Shapeable Rods

Flash imaging can be accomplished on linear and non-linear rods, wires, fabrics, nets, interstitial substrates, webs, implanted fibers, strands, filaments, cables, optical fibers, and various other elongated wire-like structures. The flash imaging conducting/heating circuit can be an extended filament, wire, or other electrical conducing strand-like element. The conducting strand-like element can be directly coated with a composition that possesses the desired optical change properties described in the above examples "Preparation of conductive heating element flash imaging substrates", "Thermochromic flash imaging game boards, game pieces, and puzzles", "Photo-luminescent/thermo-luminescent flash imaging card pieces", and "Plural photochromic/thermochromic flash imaging substrates and examples".

An electrically conducting strand-like element can be first coated with a suitable electrically insulating coating (e.g. a nickel-chromium wire coated with a thin vinyl insulation). The insulating coating can be subsequently coated with an optical change agent comprising a binding agent and the optical change agent. The optical agent coated wire can be utilized directly as a flash imaging element by placing an appropriate voltage between conducting ends to complete the circuit. Alternatively, the conducting wire can be coated with an insulating coating using standard wire coating technologies where the insulating coating contains the optical change agent as a part of the resin.

Flash imaging in wire-like formats can find a variety of applications for use in toys as a wrap-around piece, as jewelry pieces, as elements of toys or the like. Wire-like flash imaging elements can be used in electronic devices, appliances, in electrical wiring, along with electrical wire, in fuse boxes or the like to provide a signaling means that a wire is "live" and is or is not conducting electricity. Wire-like or strand-like flash imaging elements can be woven into fabrics, knitted materials, carpets, floor mats, screens, clothing, uniforms or the like and used to create an unexpected or desired optical effect in the material. Wire-like flash imaging elements can be used in conjunction with other materials, wires, rods, features, screens, or the like. By way of example, flash imaging wires can be use in house-hold screens for testing home security systems. A flash imaging strand can be used as a color change means to establish if an electrical circuit is connected or has failed.

Example 11

Flash Thermo-Luminescent/Photo-Luminescent Battery Testers

Active flash imaging circuits can be used as novel battery testers where the flash imaging circuit can directly report the charge level of a battery. For battery testing applications, producers would no longer be limited to a simple color change, but could instead have the advantage of a product that would generate light pulses through the use of photo-luminescent/thermo-luminescent coatings. Batteries could be successfully tested in the dark or under low light conditions.

Thermo-luminescent/photo-luminescent flash imaging circuits can be designed for and imprinted on substrates used applications to batteries. Flash imaging circuits can be prepared as described above in examples "Preparation of conductive heating element flash imaging substrates", "Thermochromic flash imaging game boards, game pieces, and puzzles", "Photo-luminescent/thermo-luminescent flash imaging card pieces", and "Plural photochromic/thermochromic flash imaging substrates and examples".

The flash imaging circuit can be conveniently contacted with the battery busses to utilize a battery to be tested as the power source. The flash imaging circuit must be designed and produced such that convenient contact points are utilized for user testing. Push contacts can be integrated such that the user simply needs to press a designated location on the battery to create a closed circuit necessary for inducing the flash imaging circuit.

Example 12

Additional Examples

Additional examples and applications include, but are not limited to: personalized business cards, sweepstakes tickets, alarm systems, interactive bar codes, child warning labels, child security devices, retail sales signs and pricing tags, automotive bumper stickers, baby high chairs for eating and activity, toy activity boards, credit cards, business cards, greeting cards, flash imaging on shrink plastic, bracelets used for reminding a person to perform a task (e.g. take a prescribed drug or follow a direction), interactive packaging for informing potential consumers of a product benefit, embedded security messages in currency, and the like. Since irreversible images or reversible multiple images can be generated using flash imaging devices and substrates, various format applications for disposable or reusable flash imaging circuits can be utilized. Since flash imaging can function as a simple visual imaging output or can comprise a sensing and reporting elements passively or actively, flash imaging can be use for a range of applications that involve simple message readouts or can be used actively as a part of a method for detection, measurement, or monitoring.

The subject invention provides for a number of advantages, including the following. Single and multi-optical out-put images can be generated by flash electrical heating pulses and optical pulses. Flash imaging presents a novel means of generating permanent or transient images on solid and fluid substrates. Flash imaging out-puts can include but are not limited to reversible and irreversible thermochromic changes; reversible and irreversible photochromic changes; photo-luminescent and thermo-luminescent changes; and related optical dye out-puts that create a permanent or transient optical effect in a substrate. Single image irreversible images or reversible multiple images can be generated using flash imaging devices and substrates. Flash imaging can function as a simple visual imaging output or can comprise sensing and reporting elements passively or actively. As such, the invention represents a significant contribution to the art.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. A flash imaging device comprising:
   (a) an optical change component that reversibly changes an optical property in response to an applied thermal stimulus, wherein said optical change component is chromic or luminescent;
   (b) a pliable, solid substrate; and
   (c) a thermal stimulus element configured to apply a thermal stimulus in a sufficiently controlled manner to said optical change component of said device to produce a defined display, wherein said stimulus element comprises a conductive medium.

2. The device according to claim 1, wherein said optical change component comprises an optical change agent present in a solid medium.

3. The device according to claim 1, wherein said conductive medium comprises an electrical circuit.

4. The device according to claim 1, wherein said device comprises a planar structure.

5. The device according to claim 4, wherein said device displays an image on a surface of said planar structure.

6. The device according to claim 1, wherein said device comprises a contoured structure.

7. The device according to claim 1, wherein said device has a wire configuration.

8. The device according to claim 1, wherein said optical change component changes optical properties differently in response to different applied stimuli.

9. A flash imaging device comprising:
   (a) an optical change component that reversibly changes an optical property in response to an applied thermal stimulus, wherein said optical change component is chromic or luminescent, and wherein said optical change component comprises an optical change agent present in a fluid medium;
   (b) a substrate; and
   (c) a thermal stimulus element configured to apply a thermal stimulus in a sufficiently controlled manner to said optical change component of said device to produce a defined display, wherein said stimulus element comprises a conductive medium.

10. The device according to claim 9, wherein said substrate is a solid substrate.

11. The device according to claim 10, wherein said solid substrate is a rigid substrate.

12. The device according to claim 10, wherein said solid substrate is a pliable substrate.

13. A flash imaging device comprising:
    (a) an optical change component that reversibly changes an optical property in response to an applied thermal stimulus, wherein said optical change component is chromic or luminescent, and;
    (b) a substrate; and
    (c) a thermal stimulus element configured to apply a thermal stimulus in a sufficiently controlled manner to said optical change component of said device to produce a defined display, wherein said stimulus element comprises a conductive medium, and
    wherein said device comprises a contoured structure, and wherein said device displays an image on a surface of said contoured structure.

14. A sensor comprising: a flash imaging device including,
    (a) an optical change component that reversibly changes an optical property in response to an applied thermal stimulus, wherein said optical change component is chromic or luminescent;
    (b) a substrate; and
    (c) a thermal stimulus element configured to apply a thermal stimulus in a sufficiently controlled manner to said optical change component of said device to produce a defined display, wherein said stimulus element comprises a conductive medium.

15. The sensor according to claim 14, wherein said flash imaging device is a passive component of said sensor.

16. The sensor according to claim 14, wherein said flash imaging device is an active component of said sensor.

17. A method comprising:
    contacting:
    (a) an optical change component that reversibly changes an optical property in response to an applied stimulus, wherein said optical change component is chromic or luminescent;
    (b) a substrate; and
    (c) a thermal stimulus element configured to apply a thermal stimulus in a sufficiently controlled manner to said optical change component to produce a defined display, wherein said stimulus element comprises a conductive medium;
    with each other to produce a flash imaging device.

18. The method according to claim 17, wherein said optical change component changes optical properties differently in response to different applied stimuli.

19. A method comprising using a flash imaging device comprising:
    (a) an optical change component that reversibly changes an optical property in response to an applied thermal stimulus, wherein said optical change component is chromic or luminescent;
    (b) a pliable, solid substrate; and
    (c) a thermal stimulus element configured to apply a thermal stimulus in a sufficiently controlled manner to said optical change component of said device to produce a defined display, wherein said stimulus element comprises a conductive medium.

20. The method according to claim 19, wherein said optical change component changes optical properties differently in response to different applied stimuli.

* * * * *